US009965309B2

(12) United States Patent
Fine et al.

(10) Patent No.: US 9,965,309 B2
(45) Date of Patent: May 8, 2018

(54) VIRTUAL MACHINE PLACEMENT

(71) Applicant: Empire Technology Development LLC, Wilmington, DE (US)

(72) Inventors: Kevin Fine, Yverdon-les-Bains (CH); Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days. days.

(21) Appl. No.: 14/665,726

(22) Filed: Mar. 23, 2015

(65) Prior Publication Data

US 2016/0285906 A1 Sep. 29, 2016

(51) Int. Cl.
*G06F 9/45* (2006.01)
*G06F 9/455* (2018.01)

(52) U.S. Cl.
CPC .. *G06F 9/45558* (2013.01); *G06F 2009/4557* (2013.01); *G06F 2009/45591* (2013.01)

(58) Field of Classification Search
CPC ...... G06F 15/16; G06F 15/167; G06F 15/177; G06F 15/173
USPC ........................................................ 726/25
See application file for complete search history.

(56) References Cited

U.S. PATENT DOCUMENTS

| 9,009,385 B1* | 4/2015 | Juels | G06F 3/0622 711/130 |
| 2010/0017801 A1* | 1/2010 | Kundapur | G06F 9/45558 718/1 |
| 2013/0185433 A1* | 7/2013 | Zhu | H04L 67/303 709/226 |
| 2015/0052614 A1* | 2/2015 | Crowell | G06F 21/566 726/25 |
| 2015/0089501 A1* | 3/2015 | Ganesan | G06F 9/5077 718/1 |

FOREIGN PATENT DOCUMENTS

| CN | 102571746 A | 7/2012 |
| CN | 102769670 A | 11/2012 |

OTHER PUBLICATIONS

Varadarajan, Venkatanathan, et al. "Resource-freeing attacks: improve your cloud performance (at your neighbor's expense)." Proceedings of the 2012 ACM conference on Computer and communications security. ACM, 2012. pp. 281-292.*

(Continued)

*Primary Examiner* — Harunur Rashid
(74) *Attorney, Agent, or Firm* — Dorsey & Whitney LLP (57) ABSTRACT

Technologies for virtual machine placement within a data center are described herein. An example method may include determining a shared threat potential for a virtual machine based, at least in part, on a degree of co-location the virtual machine has with a current virtual machine operating on a physical machine, determining a workload threat potential for the virtual machine based, at least in part, on a level of advantage associated with placing the virtual machine on the physical machine, determining a threat potential for the virtual machine based, at least in part, on a combination of the shared threat potential and the workload threat potential, and placing the virtual machine on the physical machine based on the threat potential.

24 Claims, 7 Drawing Sheets

(56) References Cited

OTHER PUBLICATIONS

Ristenpart et at., "Hey, you, get off of my cloud: exploring information leakage in third-party compute clouds." ACM.; Nov. 2009; In Proceedings of the 16th ACM conference on Computer and communications security (pp. 199-212).*

Son el al., "An SLA-based cloud computing that facilitates resource allocation in the distributed data centers of a cloud provider." Springer Science+Business Media New York 2013 ; Journal of Supercomputing 64.2 (2013). pp. 606-637.*

Jermyn el al., "Improving Readiness for Enterprise Migration to the Cloud" Published in: Proceeding Industry papers Proceedings of the Middleware Industry Track, Article No. 5, Bordeaux, France—Dec. 8-12, 2014 ACM New York, NY.*

"Thrashing", accessed at https://web.archive.org/web/20131208020413/http://www.computerhope.com/jargon/t/thrash.htm, accessed on Feb. 18, 2015, p. 1.

"Understanding Memory Resource Management in VMware vSphere® 5.0", accessed at https://web.archive.org/web/20140123074328/http://www.vmware.com/files/pdf/mem-_mgmt_perf_vsphere5.pdf, accessed on Feb. 18, 2015, pp. 29.

"What's Holding Back the Cloud?", accessed at https://web.archive.org/web/20130609070821/http://www.intel.com/content/dam/www/public/us/en/documents/reports/whats-holding-back-the-cloud-peer-research-report2.pdf, posted on May, 2012, pp. 31.

Afoulki, Z et al., "A Security-Aware Scheduler for Virtual Machines on IaaS Clouds", Report 2011 Universite D'Orleans, 2011, 1-13.

Ali, M et al., "Modeling virtualized infrastructures under security constraints", Conference: Proc. of the Euro-NF Int'l Workshop on Traffic and Congestion Control for the Future Internet, 2011, 5-6.

Alicherry, M et al., "Network Aware Resource Allocation in Distributed Clouds", Proceedings IEEE INFOCOM, Mar. 25-30, 2012, 963-971.

Bin, E et al., "Guaranteeing High Availability Goals for Virtual Machine Placement", 31st International Conference on Distributed Computing Systems, Jun. 20-24, 2011, 700-709.

Caron, E et al., "Improving users' isolation in IaaS: Virtual Machine Placement with Security Constraints", IEEE 7th International Conference on Cloud Computing (CLOUD), 2014, 64-71.

Dashti, M et al., "Traffic Management: A Holistic Approach to Memory Placement on NUMA Systems", Proceedings of the eighteenth international conference on Architectural support for programming languages and operating systems, 2013, 381-394.

Do, A V. et al., "Profiling Applications for Virtual Machine Placement in Clouds", IEEE 4th International Conference on Cloud Computing, Jul. 4-9, 2011, 660-667.

Hyser, C et al., "Autonomic Virtual Machine Placement in the Data Center", HP Laboratories HPL-2007-189, Dec. 11, 2007, 1-10.

Jiang, J W. et al., "Joint VM Placement and Routing for Data Center Traffic Engineering", INFOCOM, 2012, 1-12.

Levinthal, D , "Performance Analysis Guide for Intel® Core™ i7 Processor and Intel® Xeon™ 5500 processors", ccessed at https://web.archive.org/web/20140123011352/http://software.intel.com/sites/products/collateral/hpc/vtune/performance_analysis_guide.pdf, accessed on Feb. 18, 2015, pp. 72.

Li, X et al., "Energy efficient virtual machine placement algorithm with balanced and improved resource utilization in a data center", Mathematical and Computer Modelling, vol. 58, No. 5-6, 2013, 1222-1235.

Lodi, A et al., "Two-dimensional packing problems: A survey", European Journal of Operational Research, vol. 141, 2002, 241-252.

Meng, X et al., "Improving the Scalability of Data Center Networks with Traffic-aware Virtual Machine Placement", Proceedings IEEE INFOCOM, Mar. 13-19, 2010, 1-19.

Mills, K et al., "Comparing VM-Placement Algorithms for On-Demand Clouds", Third IEEE International Conference on Coud Computing Technology and Science, 2011, 91-98.

Piao, J T. et al., "A Network-aware Virtual Machine Placement and Migration Approach in Cloud Computing", Ninth International Conference on Grid and Cloud Computing, 2010, 87-92.

Ristenpart, T et al., "Hey, You, Get Off of My Cloud: Exploring Information Leakage in Third-Party Compute Clouds", Proceedings of the 16th ACM conference on Computer and communications security, 2009, 199-212.

Tang, L et al., "The Impact of Memory Subsystem Resource Sharing on Datacenter Applications", Proceedings of the 38th annual international symposium on Computer architecture, 2011, 283-294.

Wang, M et al., "Consolidating Virtual Machines with Dynamic Bandwidth Demand in Data Centers", IEEE INFOCOM, 2011, 71-75.

Wood, T et al., "Memory buddies: exploiting page sharing for smart colocation in virtualized data centers", Proceedings of the 2009 ACM SIGPLANS/SIGOPS international conference on Virtual execution environments, 2009, 31-40.

Wu, Z et al., "Whispers in the Hyper-space:High-speed Covert Channel Attacks in the Cloud", Proceedings of the 21st USENIX conference on Security symposium, 2012, 1-15.

Xin, L et al., "Balancing Resource Utilization for Continuous Virtual Machine Requests in Clouds", ixth International Conference on Innovative Mobile and Internet Services in Ubiquitous Computing (IMIS), Jul. 4-6, 2012, 266-273

Xu, Y et al., "An exploration of L2 cache covert channels in virtualized environments", Proceedings of the 3rd ACM workshop on Cloud computing security workshop, 2011, 29-40

Yu, S et al., "A Security-Awareness Virtual Machine Management Scheme Based on Chinese Wall Policy in Cloud Computing", The Scientific World Journal, vol. 2014, 2014, 1-12

Zhang, Y et al., "Cross-VM Side Channels and Their Use to Extract Private Keys", Proceedings of the 2012 ACM conference on Computer and communications security, 2012, 305-316

* cited by examiner

700 A COMPUTER PROGRAM PRODUCT

702 A SIGNAL BEARING MEDIUM

704 PROGRAMMING INSTRUCTIONS

DETERMINE A PLURALITY OF PHYSICAL MACHINES A VIRTUAL MACHINE MAY BE PLACED;

DETERMINE A SHARING THREAT POTENTIAL FOR PLACING THE VIRTUAL MACHINE ON EACH OF THE PLURALITY OF PHYSICAL MACHINES;

DETERMINE A THREAT POTENTIAL ASSOCIATED WITH PLACE THE VIRTUAL MACHINE ON EACH OF THE PLURALITY OF PHYSICAL MACHINES BASED ON THE RESPECTIVE SHARING THREAT POTENTIAL AND AN ADVANTAGE OF PLACING THE VIRTUAL MACHINE ON EACH OF THE PLURALITY OF PHYSICAL MACHINES; AND

PLACE THE VIRTUAL MACHINE ON A PHYSICAL MACHINE BASED ON THE RESPECTIVE THREAT POTENTIAL.

| 706 A COMPUTER-READABLE MEDIUM | 708 A RECORDABLE MEDIUM | 710 A COMMUNICATIONS MEDIUM |

FIGURE 7

VIRTUAL MACHINE PLACEMENT

BACKGROUND

Cloud computing has grown in popularity, allowing for remote processing and/or storage capability to be brought to bear on local processes. Cloud computing poses some risks—such as whether data and programs will be stolen and/or compromised by outside actors. Building an internal cloud structure may seem like it reduces risk, but may prevent the builder from realizing the economic and flexibility advantages more public computing clouds offer.

The security concerns that come with cloud computing, and public clouds especially, may be many and various. Some of the risks, such as directly taking over another entities' code and data, may have become more difficult due to cloud computing services directly monitoring for such activity, but more latent risks still persist. For example, side channel attacks have become a concern, and a side channel attack may allow an attacker to surreptitiously obtain data from a virtual machine without needing to hack the virtual machine. The side channel attack may allow an attacker to discern data from the target virtual machine by gaining access to memory locations the target virtual machine had previously used.

SUMMARY

Techniques are generally described that include methods and systems for securing virtual machine placement. An example method may include determining a shared threat potential for a virtual machine based, at least in part, on a degree of co-location the virtual machine has with a current virtual machine operating on a physical machine. The method may continue with determining a workload threat potential for the virtual machine based, at least in part, on a level of advantage associated with placing the virtual machine on the physical machine, and determining a threat potential for the virtual machine based, at least in part, on the combination of the shared threat potential and the workload threat potential. The method may conclude with placing the virtual machine on the physical machine based on the threat potential.

Another example method includes receiving an identification of a virtual machine to place into a data center including a plurality of physical machines coupled to a virtual machine placement interface. The method continues with determining a plurality of available physical machines to place the virtual machine based, at least in part, on a profile of the virtual machine, and estimating a respective risk level for placing the virtual machine with each of the plurality of available physical machines. The method concludes with placing the virtual machine on a physical machine of the plurality of available physical machines based on the respective risk level.

Another example virtual machine placement security technique may include a computer-readable medium that includes computer executable instructions stored thereon to perform a virtual machine placement procedure. The procedure includes code to identify a plurality of physical machines, determine a shared threat potential for placing the virtual machine on each of the plurality of physical machines, determine a threat potential associated with placing the virtual machine on each of the plurality of physical machines based on the respective shared threat potential and an advantage of placing the virtual machine on each of the plurality of physical machines, and place the virtual machine on a selected physical machine of the plurality of physical machines based on the respective threat potential.

A further example of a virtual machine placement system includes computer executable code to cause a processor to determine a plurality of available physical machines on which a virtual machine may be placed, determine a shared threat potential for placing the virtual machine on each of the plurality of available physical machines, determine a threat potential associated with placing the virtual machine on each of the plurality of available physical machines based on the respective shared threat potential and an advantage of placing the virtual machine on each of the plurality of available physical machines, and place the virtual machine on an available physical machine based on the respective threat potential.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

all arranged in accordance with at least some embodiments of the present disclosure.

DETAILED DESCRIPTION

In the following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn to, inter alia, methods, systems, products, devices, and/or apparatuses generally related to virtual machine placement including risk analysis and measures to reduce or eliminate the potential for side channel attacks conducted by nefarious virtual machines in a data center, e.g., a cloud computing setting. An example implementation of such a method may include determining a threat potential of a virtual machine to be placed onto a physical machine. The threat potential may be a combination of a shared threat potential and a workload threat potential. The shared threat potential may be based, at least in part, on a degree of co-location the virtual machine has with a current virtual machine operation on the physical machine and the workload threat potential may be based, at least in part, on a level of advantage associated with placing the virtual machine on the same physical machine. The example method may then place the virtual machine on the physical machine based on the threat potential. If the threat potential is too great, however, the virtual machine may be placed elsewhere and/or monitored for signs of executing side channel attacks on co-located virtual machine.

Figure 1:
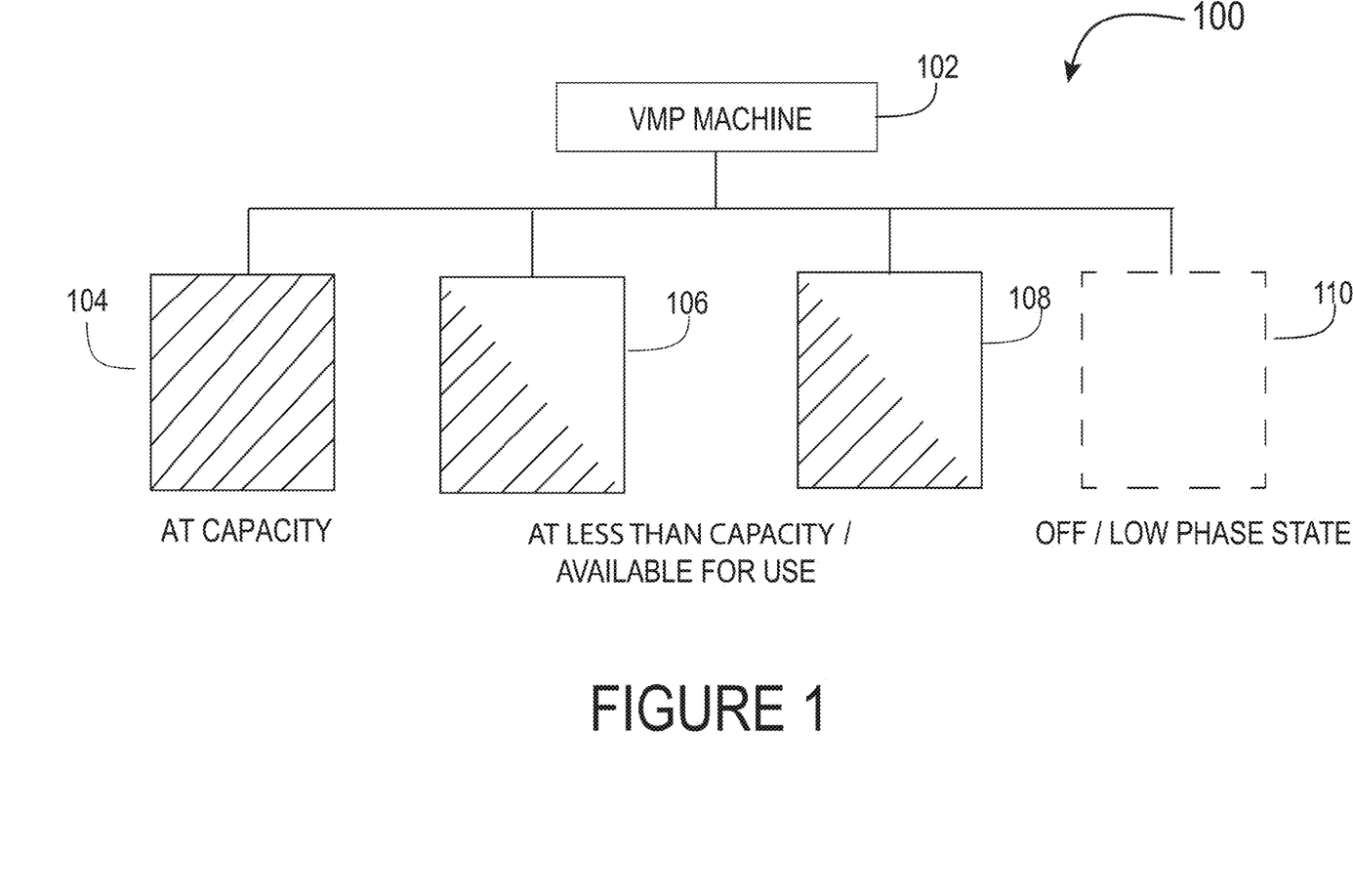
FIG. 1 is an example block diagram of a data center implementing virtual machine placement security.

FIG. 1 is an example block diagram of a data center 100 implementing virtual machine placement security, arranged in accordance with at least some embodiments of the present disclosure. The data center 100 may include, but is not limited to, a virtual machine placement (VMP) machine 102, and a multiple number of servers 104-110. Each of the various servers 104-110 may be operating at various levels of capacity and/or operational state. The various levels of capacity and/or operational state are not limiting and are used herein to facilitate discussion of the present disclosure. The VMP machine 102 may be a conventional server included in a data center, which may perform both virtual machine placement tasks along with providing virtual machine computing capacity. Else, the VMP machine 102 may be a dedicated virtual machine placement and/or monitoring resource. The VMP machine 102 may also be referred to herein as a server 102. The servers 104-110 may be conventional servers as known to those of skill in the art, and which may provide virtual machine capacity to the data center 100.

A cloud computing provider may leverage a large data center, such as the example data center 100, to provide dynamic, on-demand computing resources to a large number of varied clients. One tool that allows cloud computing to perform as they do is virtualization of processing platforms. A client's computing platform may be virtualized, making it available to be run on one or more physical machines instead of the platform being tied to a particular physical machine. As used herein, "virtual machines" may refer to software computers that, like physical computers, include their own operating system and applications such as a set of specification and configuration files and are backed by the physical resources of a host. The virtual machines may be run on (e.g., hosted on) a single physical machine (e.g., the physical resources of its host) along with other virtual machines. A single physical machine may be able to host a multiple number of virtual machines at any one time and divide resource usage as required for each of the virtual machines to execute. An amount of co-location between multiple virtual machines may be determined by the server, processor, and/or core design. For example, two virtual machines operating on the same server may utilize different areas of the server and may not overlap on any one resource, e.g., memory, processor core, network connection, etc. Conversely, a single core in a server chip may host multiple virtual machines at once and those virtual machines would likely be sharing the processor core, the associated level 1 and level 2 cache areas, and the level 3 cache areas, for example. Further, the level 3 cache areas may serve multiple virtual machines located on more than one processor core. A virtual machine manager may manage the placement of the virtual machines into servers of the data center 100. The virtual machine manager may also be referred to as a hypervisor.

The example data center 100 may include one or more servers 102-110. Each server may be operating at varying degrees of capacity and each server may also be assigned to various data center-related management tasks. For example, the server 102 may be executing a virtual machine placement process and may also be a host for virtual machines. For illustration, the server 104 is shown to be at capacity and may not be able to host any additional virtual machines. Servers 106 and 108 may both be at less than capacity and available for hosting one or more additional virtual machines. The server 110 may be in a powered down mode, e.g., off, to conserve energy and may be brought on line to host virtual machines as demand of the data center 100 increase. Further, the data center 100, through the server 102, may move virtual machines around and may power on and off servers as demand changes. For brevity sake, only four servers are shown, but a data center may have any number of servers and the disclosure discussed herein can be implemented in a data center of any size.

The data center 100 may also include various databases (e.g., those shown in FIG. 5) that store various management, statistical, and workload data gathered through various monitoring processes. Example databases may include a database of trusted partners that indicates what other data center clients each data center client may be co-located with, if required. Other databases may include a historical workload database that tracks workload requirements of virtual machines, and a running workload database that tracks the workloads of virtual machines currently operating in the data center 100. The data center 100 may also include monitoring processes that monitor the physical and virtual machines for performance characteristics and trouble shooting. A performance monitor may monitor the physical machines to track various performance aspects such as memory usage, Central Processing Unit (CPU) usage, and network resource usage, for example. These various databases and monitors may assist the data center 100 in managing virtual machine placement and physical machine up/down time.

As noted, the server 102 may execute a virtual machine placement (VMP) process when a new virtual machine is activated, e.g., hosted by a physical machine, in the data center 100. The VMP process may be useful in determining which physical machine to place the new virtual machine since virtual machines share hardware. The sharing of hardware, however, may cause conflicts between virtual machines when the virtual machines compete for resources. Thus, certain virtual machines may be poor co-residents due to conflicting demands. For example, hypervisors (which manage the virtual machines) may over commit memory relying upon the good chance that multiple virtual machines may not use all their memory at once. However, two virtual machines that both require a lot of memory may together exceed allocated memory capacity causing page faults and swapping from main memory to disk, which may result in thrashing, e.g., the excessive movement of information between system memory and virtual memory when there is not enough system memory available. Application processing may almost stop when thrashing occurs.

Each virtual machine may be characterized by a profile, e.g., a measure of various requirements of the virtual machine such as memory usage, processor usage, and network usage, for example, which the VMP may account for during the placement process. As will be further discussed below, a virtual machine's profile may be used during threat potential analysis. The profile of a virtual machine may help determine what physical machine may be best suited to host the virtual machine. For example, if a virtual machine's profile is light on memory and processor demands, but heavy on network usage demands, then a physical machine with plenty of network usage bandwidth even if low on memory and processor resources, may be an available physical machine for hosting this virtual machine.

Each server may be a potential location for placing an incoming virtual machine by the VMP machine (server) 102. Not all servers may be available, and the servers may be designated by their current working status, such as fully loaded, partially loaded, and off/in a powered down/low phase state as noted in FIG. 1. A fully loaded server is one that may not be able to accommodate any more virtual machines without running out of resources, such as server 104 for example, due to being fully loaded or at capacity. This may not mean that all resources of the server 104 are efficiently utilized or that only one resource is at capacity while other resources are less utilized. One advantage of a VMP process may be the ability of the VMP process to assign virtual machines to use data center 100 resources efficiently so that fewer resources may be wasted and/or fewer servers may be needed at any given time. This advantage may result in reduced power consumption, for example.

In the data center 100, there may be at least four data center management processes continuously operating. Those four processes may include placing newly activated virtual machines into the data center, activating/deactivating servers according to the data center workload, migrating virtual machines from one server to another, and/or suspending or storing virtual machines, which may be based on client direction. The activation and movement of virtual machines may run the risk of producing security concerns such as side channel attacks by nefarious virtual machines.

The new virtual machine may be new to the data center 100, such as by being activated from a suspended state, or it may be new in terms of being moved within the data center, such as from one server to another. This movement within the data center may be due to an advantage of being a virtual machine, which is a self-contained package. A virtual machine may run for a while, be stopped and saved to disk, then restarted from where it previously left off. A virtual machine may also be migrated while running from one physical machine to another without interruption or significant interruption of service. This is referred to as live migration, which may be useful to optimize data center performance.

In some embodiments, the new virtual machine may only be loaded on a partially loaded server. For security purposes, in the data center 100 it may be better to have more partially filled servers over a fewer number of servers that are nearly at capacity and/or a lot of servers hosting only one or two virtual machines because the more numerous the potential places the new virtual machine may be placed, the more difficult it may be to place a nefarious virtual machine with a specific target virtual machine. Although fewer active servers may be beneficial for power concerns, more active servers may be beneficial for security concerns. Thus, there may be a tradeoff between power conservation and enhanced security.

Conventional VMP algorithms may, however, introduce a new vulnerability into data centers. Because the conventional VMP algorithms tend to group complementary virtual machines together, they may be leveraged by attackers to steal data from neighboring, e.g., co-located, virtual machines. The first step in an attack may be to place an attacking virtual machine co-resident with a target virtual machine. If an attacker knows the resource profile of a target, the attacker may be able to craft an attacking virtual machine with a complementary profile, thereby increasing the chances the attacking virtual machine may be placed with the target virtual machine. Accordingly, the conventional VMP algorithm may inadvertently aid attackers in co-locating their virtual machines with their targets due to partially basing the location selection on the virtual machine profile. Once two virtual machines are sharing the same physical machine, several side channel attacks exist, including using shared memory, shared cache, disk access, and even the memory bus for gaining access to the contents of the target virtual machine. Thus, there may be a need for enhanced VMP process to increase data center efficiency without increasing the threat of side channel attacks.

As discussed above, one solution may involve determining a threat potential of a virtual machine during the VMP process. The threat potential may provide a risk analysis associated with placing the new virtual machine in each of a multiple number of available physical machines, e.g., a plurality of virtual machines. The threat potential may be determined based on an amount of hardware sharing with co-resident virtual machines combined with the uniqueness of the virtual machine's profile. The uniqueness of the virtual machine's profile may be a characterization of the relative resource levels required. For example, a virtual machine that requires a very high level of one resource, e.g., CPU, compared to the other resource requirements, e.g., memory and network, may be considered a unique profile. A virtual machine with a unique profile may be easier to target than a virtual machine with a less unique profile, e.g., more even resource requirements for each resource. The solution may select placements with a threat potential below a first threshold. The threshold may indicate an acceptable level of risk, which may be determined by the data center and/or the data center clients. Further, if the threat potential associated with the selected location is above a second threshold, then the VMP process may enable a side channel monitor to monitor the new virtual machine for odd behavior, e.g., side channel attacks.

For each new virtual machine to be placed into the data center, a threat potential T, may be determined. T may be normalized to a scale from 0 to 1, where 0 may indicate a low level of threat potential, e.g., less risk, and 1 may indicate a high level of threat potential, e.g., elevated risk. The 0 to 1 scale is used herein for illustrative purposes and is not limiting. The threat potential T, may be broken into two components: a sharing threat potential $T_{share}$ and a workload threat potential $T_{workload}$. The sharing threat potential may be proportionate to a level of hardware sharing with one or more other virtual machines, where the number of other virtual machines at that level of hardware may also affect the sharing threat potential. The workload threat potential may account for the uniqueness of the virtual machine profile, e.g., the different amounts of resources required for the virtual machine. The sharing threat potential and the workload threat potential may be combined, e.g., multiplied, to provide the overall threat potential T. The threat potential may then be utilized by a VMP process in selecting a less risky location in the data center, e.g., the core/processor/server (physical machine) location, to place the virtual machine so to minimize or eliminate any risk of side channel attacks from nefarious virtual machines currently operating in or to be activated in the data center.

Figure 2:
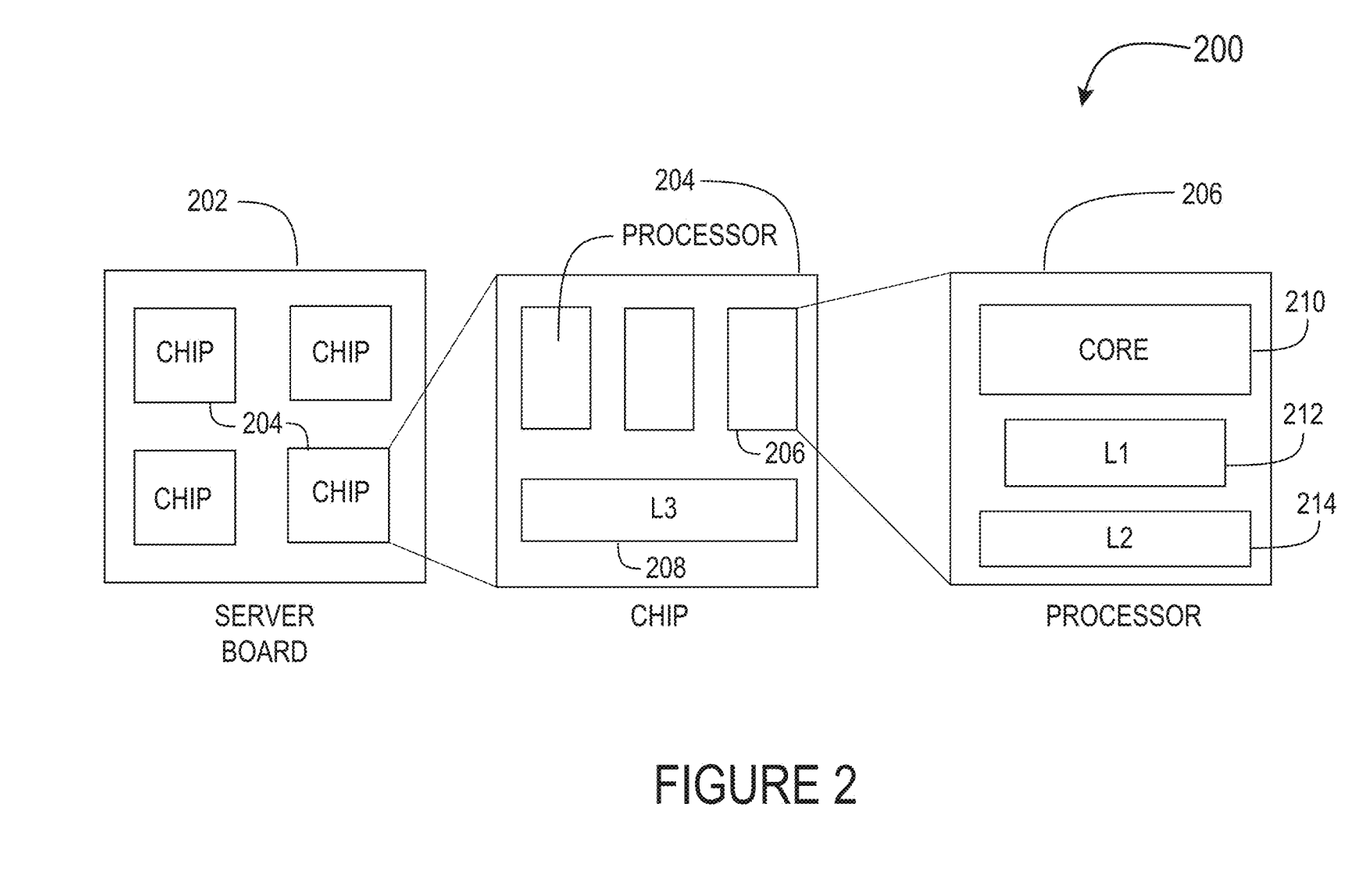
FIG. 2 is an example block diagram of a data center server showing various levels of potential hardware co-location.

FIG. 2 is an example block diagram of a data center server 200 showing various levels of potential hardware co-location, arranged in accordance with at least some embodiments of the present disclosure. The server 200 may include a server board 202, which may include multiple chips 204. The server 200 may include additional server boards 202, but only one is discussed for brevity and clarity. Each chip 204 may include multiple processors 206 and a shared level 3 cache 208. Each processor 206 may include a core 210, a level 1 cache 212, and a level 2 cache 214. For brevity and clarity, other standard features of the server board, chip, and core have been omitted.

A new virtual machine being placed onto the server 200 may be placed in any of the cores in one of the chips. Thus, different degrees of co-location may exist if two virtual machines are co-located on the same board. These different levels of co-location may be the same board but different chips/cores, the same chip but different cores or within the same core. Sharing in the same core may be implemented in two different modes: same core with time sharing (e.g., multiple virtual machines taking their one time slots) and same core in a Symmetric Multi-Thread (SMT) mode. The SMT mode may be characterized as an extremely high level of intimacy between multiple virtual machines that a data center may decide to disable this mode so that no core operates in this manner. As such, the degree of co-location becomes greater as virtual machines more intimately share resources. Further, the more intimate the sharing the higher the sharing threat potential may become. For example, two or more virtual machines on the same board but not the same chip may have a very low sharing threat potential while two or more virtual machines on the same processor may have a very high sharing threat potential. The sharing threat potential may thus be estimated by $$T_{share} = aT_{SMT} + bT_P + gT_C + dT_B \quad \text{(Eq. 1)}$$

where $T_{SMT}$ is the threat potential for the SMT mode, $T_P$ is the threat potential for processor co-location in the time sharing mode, $T_C$ is the threat potential for chip co-location but on different cores, and $T_B$ is the server/board level co-location but on different chips. The four adjustable constants a, b, g, and d may control the relative risk level designation of each sharing level. For ease of calculation, the constants may be normalized to one so that the summation of a, b, g, and d equals 1. As noted, the SMT mode may not be desirable due to the associated high level of risk, so a may be set to zero. Conversely, d may be set to zero because the threat risk may be negligible for two virtual machines on the same board. The level of resource sharing on a single chip may be low due to level 3 cache being the main shared resource. As such, g may be set less than b since processor sharing may include sharing both level 1 and level 2 cache along with level 3 cache. A data center may set the various constants and the server type and architecture type may also influence the constants. If, however, the SMT mode is enabled by a data center, then a may be set higher than b to account for the higher risk associated with the SMT mode. For an example, b may be set twice g, given a b value of 0.67 and a g value of 0.33. Lastly, with a and d both set to zero, $T_{share}$ may reduce to $bT_P + gT_C$.

The sharing threat potential, as discussed above, may also be affected by the number of virtual machines residing at each level of the server 200. Each level of co-location, e.g., board, chip, processor, may hold a plurality of virtual machines, where the total number of virtual machines on a server being the summation of all virtual machines on each core of each chip. For example, a server that includes two chips, with each chip including four cores, may host 31 virtual machines, which may breakdown into 16 virtual machines on chip one and 15 virtual machines on chip 2. The number of virtual machines on each chip may be further broken down based on how many virtual machines are on each processor. Thus, the sharing threat potential may be affected by the number of virtual machines at each level of co-location, and each level may be affected differently. For example, the number of virtual machines at the server level may not affect the sharing threat potential calculation. However, the number of virtual machines sharing the chip or processor level may affect the sharing threat potential calculation.

At the processor level, the sharing threat potential $T_P$ may be a minimum if only one virtual machine is hosted. However, as the number of virtual machines on the same processor increases above one, the threat level $T_P$ may increase. For example, $T_P$ may be at its highest level when there are two virtual machines on the processor. As the number of virtual machines on the processor increases, the threat level may decay from a maximum of one, for example, based on the relation of $1/(N_P-1)$, where $N_P$ represents the number of virtual machines on the processor. Thus, $T_P$ may be zero when there is only one virtual machine on the core and $T_P$ may be equal to $1/(N_P-1)$ for $N_P$ greater than one.

At the chip level, the sharing threat potential $T_C$ may be a minimum when the number of virtual machines on the chip ($N_C$) equals the number of virtual machines on the processors ($N_P$) of that chip. $T_C$, however, may be a maximum when $N_C-N_P$ equals one. Thus, the relationship between $T_C$ and $N_C-N_P$ may be defined as zero when $N_C=N_P$ and decay as $1/(N_C-N_P)$ for values of $N_C-N_P$ greater than one. For both the chip level and the processor level, their respective sharing threat potentials decrease for increasing numbers of virtual machines co-located at the various levels.

Therefore, combing the co-location aspect of $T_{share}$ with the number of virtual machines co-located aspect of Tshare provides the following composite relationship:

$$T_{share} = aT_{SMT} + b(1/(N_P-1)) + g(1/(N_C-N_P)) + dT_B \quad \text{(Eq. 2)}$$

Figure 3:
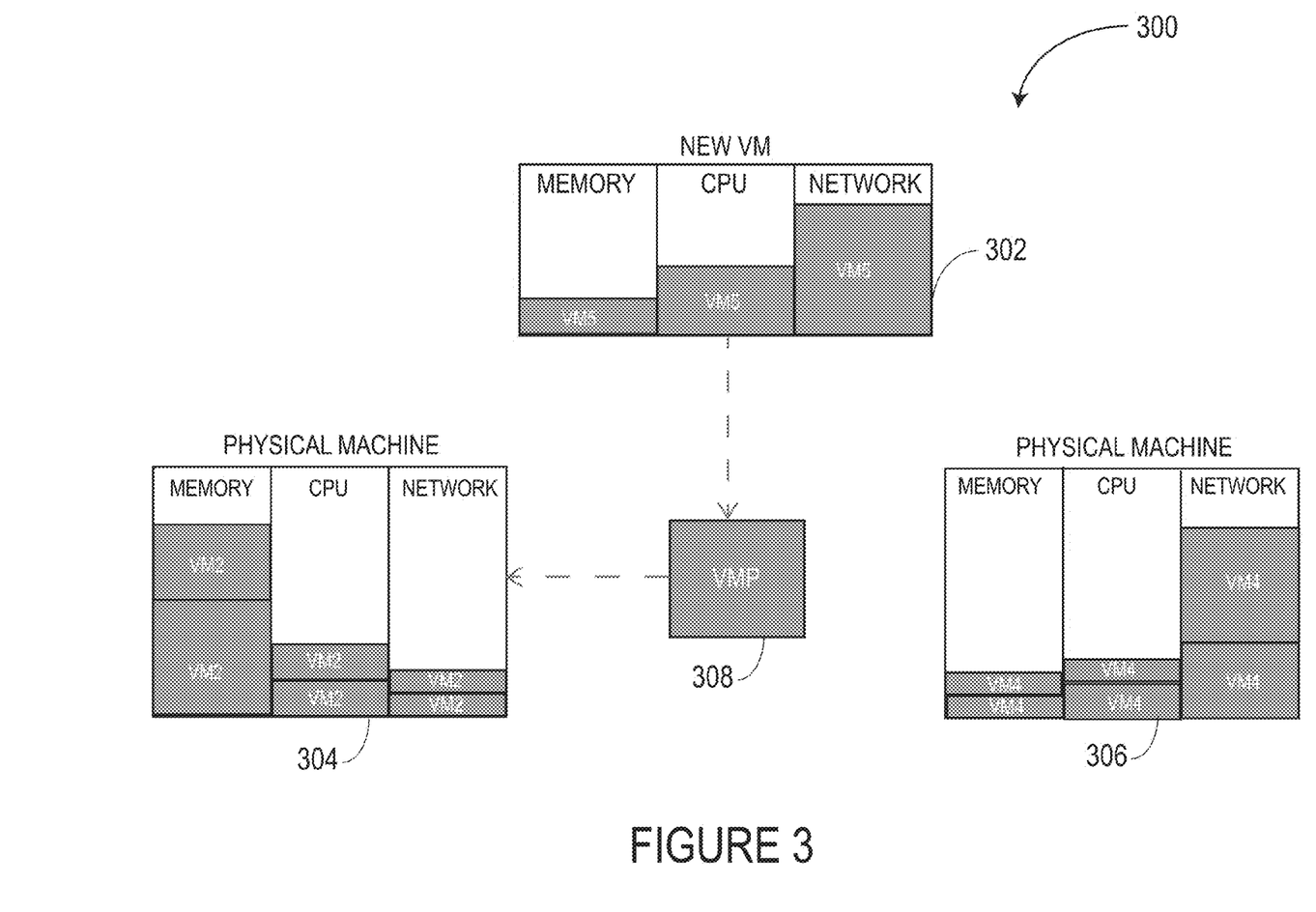
FIG. 3 is an example virtual machine placement scenario to illustrate the workload threat potential.

The other aspect of the threat potential is the workload threat potential $T_{workload}$. FIG. 3 is an example virtual machine placement scenario 300 to illustrate the workload threat potential, arranged in accordance with at least some embodiments of the present disclosure. The example scenario 300 shows a VMP 308, a new virtual machine 302, a physical machine 304, and a physical machine 306. The virtual machine 302 may provide an example virtual machine profile indicated by an amount of usage in three categories as shown by the dark areas. The virtual machine 302 may require a small amount of memory usage, a small amount of CPU usage, and a large amount of network resource usage. The combination of the three categories may be referred to as the profile of the virtual machine 302. Only three categories are shown in FIG. 3, but the present disclosure is not so limited. Fewer or more categories may be accounted for without deviating from the scope of the present disclosure.

The VMP 308 may analyze the profile of the virtual machine 302 and then determine which of the two physical machines 304, 306 may be the best location for the virtual machine 302 based at least in part on the profile. Based on this analysis, the VMP 308 may push the virtual machine 302 toward the physical machine 304. Because the physical machine 304 has extra capacity in the network category while the physical machine 306 does not, the VMP 308 may select the physical machine 304 to host the virtual machine 302. Due to the uniqueness of the profile for the virtual machine 302, the push to the physical machine may create risk if the selection of the physical machine 304 is the only place to locate the virtual machine 302. If, however, the profile of the virtual machine is less unique, e.g., the requirements of the three categories are more equal, for example, the number of locations to place the virtual machine may increase, thus reducing the workload risk. This uniqueness may be accounted for based on an advantage of placing the virtual machine into each available location within a data center.

For each potential location within a data center for placing the virtual machine 302, the VMP 308 may determine an advantage associated with each potential location. The advantage may be proportional to a degree of fit between the virtual machine and the potential location. The advantage may also be based on some factor to be maximized within the data center, which may also guide the location process. The factor to be maximized may be energy efficiency, network usage, memory efficiency, or some combination thereof, for example. The advantage, and thus the workload threat potential $T_{workload}$, may be defined as $$A_i = C_i / \Sigma_{all\ i} C_i \quad \text{(Eq. 3)}$$

where $A_i$ represents the advantage, and $C_i$ represents a positive number proportional to the factor which is to be maximized. The workload threat potential may become smaller as the possible number of placements is spread over more servers within a data center. Conversely, as the number of potential placements reduces due to the uniqueness of the profile, the riskier each location may become.

To summarize, the threat potential T may be the combination of the sharing threat potential $T_{share}$ and the workload threat potential $T_{workload}$. Both threat potential factors may be estimated and combined for all potential or available placement locations for each new virtual machine. The risk analysis estimation may be determined by a data center whenever new virtual machines are added or whenever virtual machines are migrated within the data center.

Figure 4:
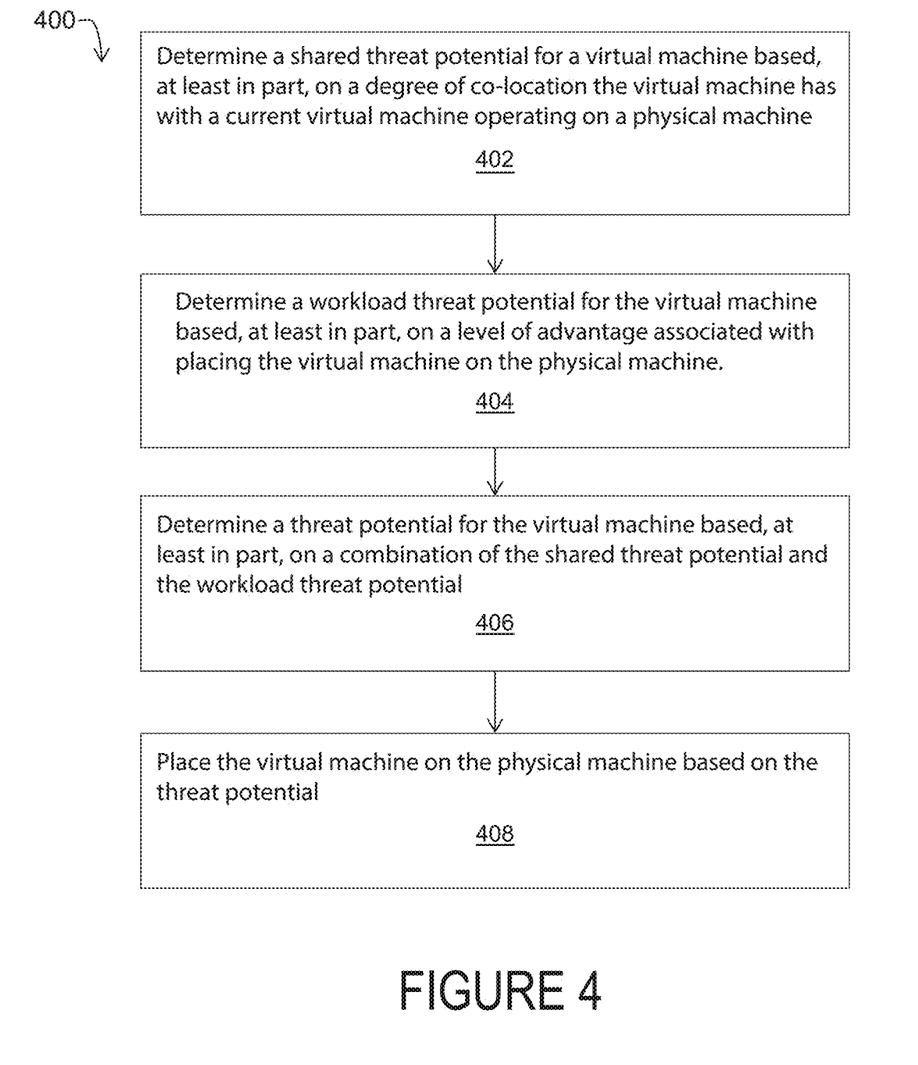
FIG. 4 is an example flow chart of a method to determine a risk potential of a virtual machine.

FIG. 4 is an example flow chart of a method 400 to determine a risk potential of a virtual machine, arranged in accordance with at least some embodiments of the present disclosure. An example method may include one or more operations, functions or actions as illustrated by one or more of blocks 402 through 408. The operations described in the blocks 402 through 408 may be performed in response to execution (such as by one or more processors described herein) of computer-executable instructions stored in a computer-readable medium, such as a computer-readable medium of a computing device or some other controller similarly configured.

The blocks included in the described example methods are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc. In some examples, the workload threat potential may be determined before or in combination with the determination of the shared threat potential.

An example process may begin with block 402, which recites, "Determine a shared threat potential for a virtual machine based, at least in part, on a degree of co-location the virtual machine has with a current virtual machine operating on a physical machine." The shared threat potential may be determined for a virtual machine before being placed in a data center. The shared threat potential may be based on the degree of co-location the virtual machine has with one or more other virtual machines on an available physical machine. The degree of co-location may be determined by how many and/or intimately resources of the physical machine are shared between the virtual machine and a current virtual machine on the physical machine. Additionally, the number of virtual machines currently on the physical machine may be taken into account in determining the shared threat potential. Block 402 may be followed by block 404.

Block 404 recites, "Determine a workload threat potential for the virtual machine based, at least in part, on a level of advantage associated with placing the virtual machine on the physical machine." The advantage associated with placing the virtual machine on the physical machine may be based, at least in part, on the profile of the virtual machine. Analysis of the advantage may determine the workload threat potential. As the advantage increases for an available location, such as the physical machine, the workload threat potential increases. Block 404 may be followed by block 406.

Block 406 recites, "Determine a threat potential for the virtual machine based, at least in part, on a combination of the shared threat potential and the workload threat potential." The threat potential for placing the virtual machine on the physical machine may then be determined by multiplying the shared threat potential by the workload threat potential. The threat potential may then be used by a VMP process to determine where the virtual machine should be placed within a data center. Block 406 may be followed by block 408.

Block 408 recites, "Place the virtual machine on the physical machine based on the threat potential." The VMP process may place the virtual machine on the physical machine based on the threat potential. If the threat is too great, for example, the virtual machine may not be placed on the physical machine. On the other hand, if the threat potential is acceptable, the virtual machine may be placed on the physical machine.

Figure 5:
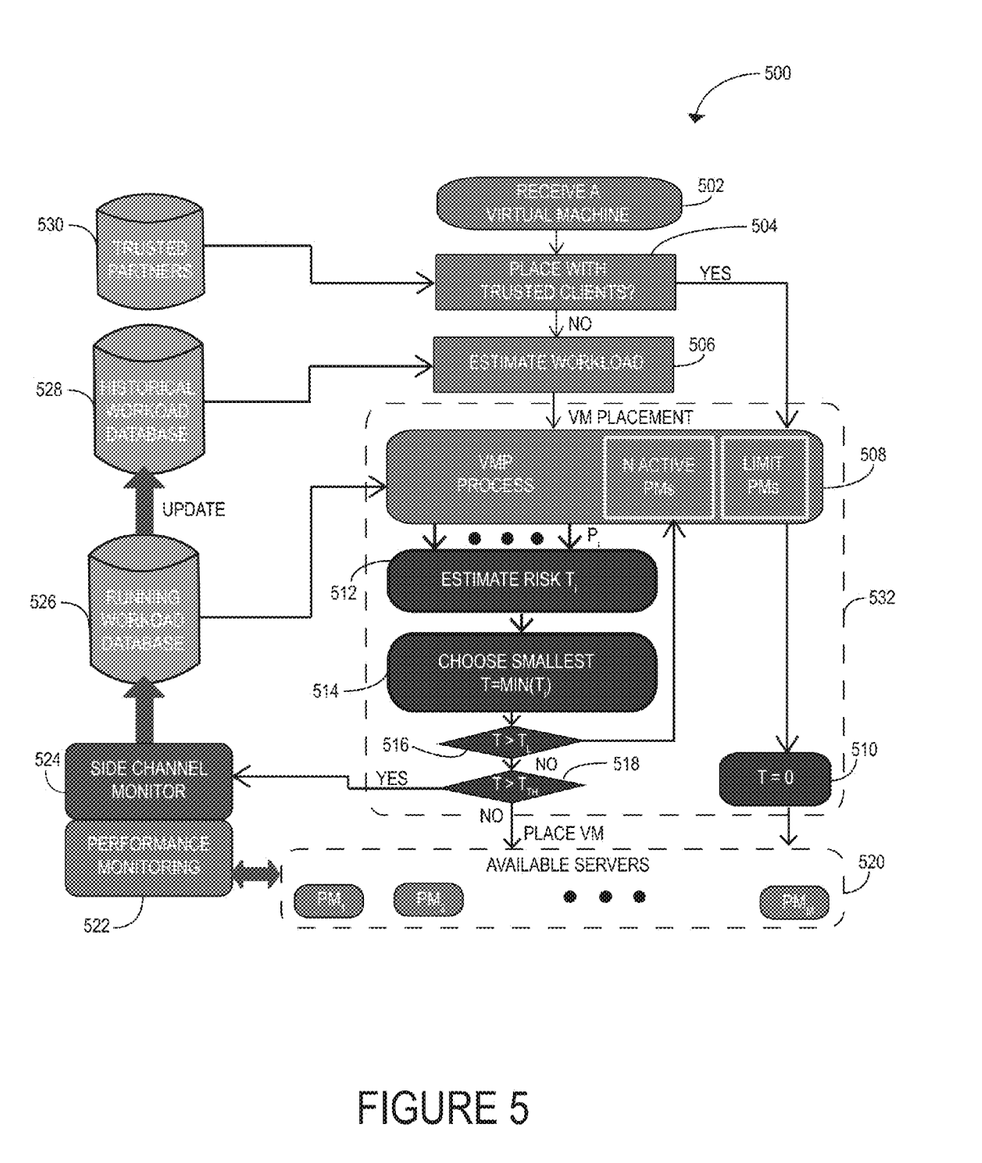
FIG. 5 is an example flow chart of a method to securely place a virtual machine in a data center.

FIG. 5 is an example flow chart of a method 500 to securely place a virtual machine in a data center, arranged in accordance with at least some embodiments of the present disclosure. An example method may include one or more operations, functions or actions as illustrated by one or more of blocks 502 through 532. The operations described in the blocks 502 through 532 may be performed in response to execution (such as by one or more processors described herein) of computer-executable instructions stored in a computer-readable medium, such as a computer-readable medium of a computing device or some other controller similarly configured.

The flow chart depicted in FIG. 5 is an example illustration of how the threat potential analysis described above may be incorporated into a VMP process performed by a data center to protect against potential side channel attacks. The VMP process may be performed when activating a new virtual machine in the data center or when virtual machines are migrated within the data center.

An example process may begin with block 502 ("RECEIVE A VIRTUAL MACHINE"). Block 502 may be followed by block 504 ("PLACE WITH TRUSTED CLIENTS?"), where a determination may be made as to whether the new virtual machine is to be placed with trusted clients. If the new virtual machine is not to be placed with trusted clients, then block 504 may be followed by block 506 ("ESTIMATE WORKLOAD"). Else, if the new virtual machine is to be placed with trusted clients, then block 504 may be followed by block 532 ("VM PLACEMENT"), where the virtual machine placement process including the threat potential analysis may be performed. Block 532 may also follow block 506. Block 532 may be followed by block 520 ("AVAILABLE SERVERS"), where the new virtual machine may be placed into the selected server, e.g., physical machine.

The block 532 may include additional blocks as depicted in FIG. 5. The blocks included in the block 532 may begin with block 508 ("VMP PROCESS"), where the VMP process is initiated. Block 510 ("T=0") may follow block 508, where a threat potential of zero is referenced, which implies a new virtual machine may be placed in a physical machine 520 that has been determined to have a threat potential of zero. Additionally, block 512 ("ESTIMATE RISK $T_i$") may follow block 508, where the risk estimate, e.g., threat potential, of the new virtual machine may be determined. Block 512 may be followed by block 514 ("CHOOSE SMALLEST T=MIN($T_i$)"), where the physical machine with the smallest risk may be chosen. Block 514 may be followed by decision block 516 ("T>$T_L$"), where a determination may be made of whether the smallest risk is greater than a first threshold. The block 516 may be followed by the decision block 518 ("T>$T_{TH}$"), where a subsequent determination may be made of whether the smallest risk is greater than a second threshold. Block 518 may be followed by the block 520.

The blocks included in the described example methods are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc. In some examples, a side channel monitor is enabled due to a threat level being greater than a second threshold.

In block 502, the received virtual machine may be a newly activated virtual machine that needs to be placed into a data center, such as the data center 100, to be hosted. Alternatively, the received virtual machine may be in the process of being migrated from one server within the data center to another, e.g., live migration. In either or both cases, the virtual machine may go through the same threat analysis as discussed herein.

In block 504, a determination is made as to whether the received virtual machine should be placed with a trusted client. This decision is made to determine whether the client associated with the virtual machine prefers their virtual machines to be placed on servers with a delineated list of "trusted partners." A trusted partner may be another client of the data center that the current client trusts. If the determination in block 504 is yes, as in the virtual machine is to be placed on servers with trusted clients (or by itself), then, in block 508, the VMP process places the virtual machine on a server that is either empty or contains only virtual machines of trusted client(s).

If however, there is no restriction on where the virtual machine is to be placed, then, in block 506, an estimate of the workload of the virtual machine is made. The estimation of the workload may provide the profile of the virtual machine, which may be used by the VMP in the threat potential analysis. If this virtual machine has a history at the data center, then the workload estimation may consult a historical workload database 528 to estimate expected workload. If, however, this is a new virtual machine, e.g., the virtual machine has never been hosted by the data center, then averages over all virtual machines of this type based on the historical workload database 528 may be used as an estimate of the workload.

In block 508, the VMP process is initiated, which determines where to place incoming virtual machines and turns on/off servers in the data center. The block 508 may limit the number of servers available to place a virtual machine if the virtual machine is to only be placed with trusted partners. Additionally, the block 508 may determine where an unencumbered virtual machine is to be placed within the data center. The blocks 512-518 are shown as separate blocks for ease of description but are also part of the block 508/532.

In block 512, the VMP process may estimate the threat potential $T_i$ for all available servers in the data center. Further, the estimation of $T_i$ may follow the method discussed in regards to FIG. 4. For example, the estimation of risk $T_i$ may at least determine a shared threat potential and a workload threat potential for each of the available servers, e.g., physical machines. As discussed above the shared threat potential may be based on the degree of co-location the virtual machine will have with one or more other virtual machines on a server and may also include the number of machines hosted by that server at the various levels of co-location. The workload threat potential may be based on an advantage of placing the virtual machine in each of the available servers, where the advantage is based at least in part on the profile of the virtual machine.

In block 514, the VMP process may determine which of the available server/physical machines has the smallest $T_i$ (threat/risk). The available server/physical machine with the smallest threat/risk may be selected to minimize the threat level the virtual machine may experience and further to reduce or eliminate any potential for side channel attacks and/or other security risks from the other virtual machines hosted by or to be hosted by the same server. Depending on the level of the smallest threat/risk, a further determinations may be made regarding monitoring for side channel attacks and/or the activation of additional servers within the data center.

In block 516, the VMP process may determine whether the smallest threat/risk is greater than a first risk threshold. This block may determine whether the threat potential of the selected server to place the virtual machine, e.g., the server with the smallest threat/risk, is greater than a predetermined threat threshold. The predetermined threat threshold $T_L$ may be a threshold related to how many virtual machines are operating on a number of active physical machines, e.g., how full the data center is based on the number of active physical machines. This threshold may be set by the data center to manage the security-power consumption trade-off, discussed above. If it is determined at block 516 that $T_i$ is greater than $T_L$, then the block 508 may activate one or more additional servers. If one or more servers are activated by the VMP process, then the data center may have the option to place the new virtual machine onto a newly activated server or to rearrange one or more of the virtual machines currently activated in the data center (e.g., live migration) and perform the VMP process analysis for any virtual machines relocated. If, however, it is determined at block 516 that $T_i$ is less than $T_L$, then the method proceeds to block 518.

In block 518, the VMP process may determine whether the smallest threat/risk is greater than a second risk threshold. The second risk threshold $T_{TH}$ may be based on a level of risk the client associated with the virtual machine is comfortable taking. As such, $T_{TH}$ may be different for each data center client. If $T_i$ is determined to be greater than $T_{TH}$, then the VMP process may activate a side channel monitor 524. The side channel monitor 524 may actively monitor the server the virtual machine is placed for side channel attacks in addition to any other servers that may currently be under monitor for potential side channel attacks. If, however, the smallest threat/risk $T_i$ is less than $T_{TH}$, then the virtual machine may be placed on the selected server/physical machine.

Alternatively, block 508 may execute multiple different VMP processes, with each VMP process set to optimize for a different aspect of the data center. The different optimizations may include power consumption, memory usage, processor usage, and network resources, to name a few. Then, the best choice out of all the different VMP processes optimizations may be the bases for placement the virtual machine into the data center.

Performance monitoring 522 may monitor the performance of the hosted virtual machines and update the running workload database 526 for each hosted virtual machine. The running workload database 526 may update the historical data in the historical workload database 528 periodically or when a virtual machine is deactivated. The blocks 522-530 may be stored on one or more servers operating in the data center and may be accessed and updated at any time. Further, the blocks 522-530 may be a part of the data center management.

Figure 6:
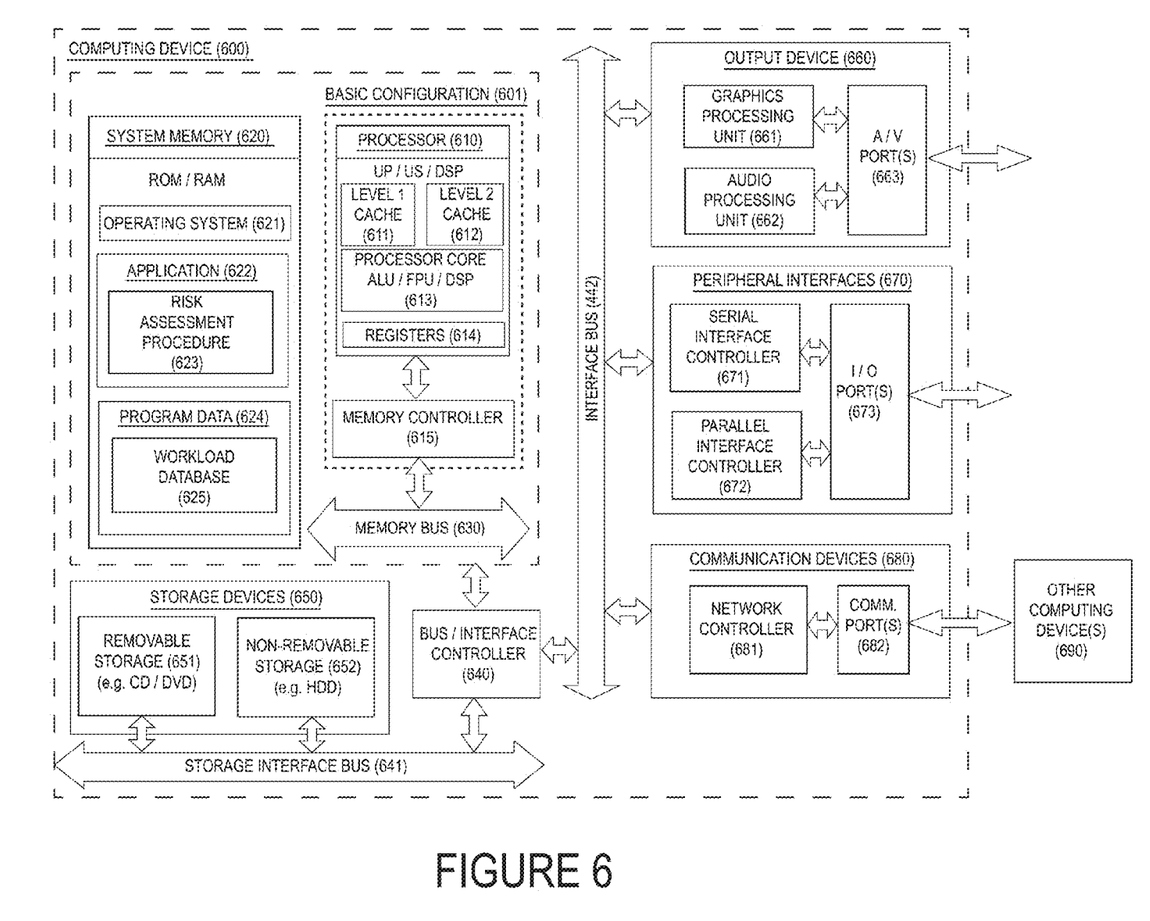
FIG. 6 is a block diagram illustrating an example computing device that is arranged for virtual machine placement security.

FIG. 6 is a block diagram illustrating an example computing device 600 that is arranged for positioning nanostructures, arranged in accordance with at least some embodiments of the present disclosure. In a very basic configuration 601, computing device 600 typically includes one or more processors 610 and system memory 620. A memory bus 630 may be used for communicating between the processor 610 and the system memory 620.

Depending on the desired configuration, processor 610 may be of any type including but not limited to a microprocessor (μP), a microcontroller (μC), a digital signal processor (DSP), or any combination thereof. Processor 610 may include one more levels of caching, such as a level one cache 611 and a level two cache 612, a processor core 613, and registers 614. An example processor core 613 may include an arithmetic logic unit (ALU), a floating point unit (FPU), a digital signal processing core (DSP Core), or any combination thereof. An example memory controller 615 may also be used with the processor 610, or in some implementations the memory controller 615 may be an internal part of the processor 610.

Depending on the desired configuration, the system memory 620 may be of any type including but not limited to volatile memory (such as RAM), non-volatile memory (such as ROM, flash memory, etc.) or any combination thereof. System memory 620 may include an operating system 621, one or more applications 622, and program data 624. Application 622 may include a risk assessment procedure 623 that is arranged to determine a threat potential of a virtual machine as described herein. Program data 624 may include virtual machine workload databases, and/or other information useful for the implementation of risk assessment. In some embodiments, application 622 may be arranged to operate with program data 624 on an operating system 621 such that any of the procedures described herein may be performed. This described basic configuration is illustrated in FIG. 6 by those components within dashed line of the basic configuration 601.

Computing device 600 may have additional features or functionality, and additional interfaces to facilitate communications between the basic configuration 601 and any required devices and interfaces. For example, a bus/interface controller 640 may be used to facilitate communications between the basic configuration 601 and one or more storage devices 650 via a storage interface bus 641. The storage devices 650 may be removable storage devices 651, non-removable storage devices 652, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 620, removable storage devices 651 and non-removable storage devices 652 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 642 for facilitating communication from various interface devices (e.g., output interfaces, peripheral interfaces, and communication interfaces) to the basic configuration 601 via the bus/interface controller 640. Example output devices 660 include a graphics processing unit 661 and an audio processing unit 662, which may be configured to communicate to various external devices such as a display or speakers via one or more A/V ports 663. Example peripheral interfaces 670 include a serial interface controller 671 or a parallel interface controller 672, which may be configured to communicate with external devices such as input devices (e.g., keyboard, mouse, pen, voice input device, touch input device, etc.) or other peripheral devices (e.g., printer, scanner, etc.) via one or more I/O ports 673. An example communication device 680 includes a network controller 681, which may be arranged to facilitate communications with one or more other computing devices 690 over a network communication link via one or more communication ports 682.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

Figure 7:
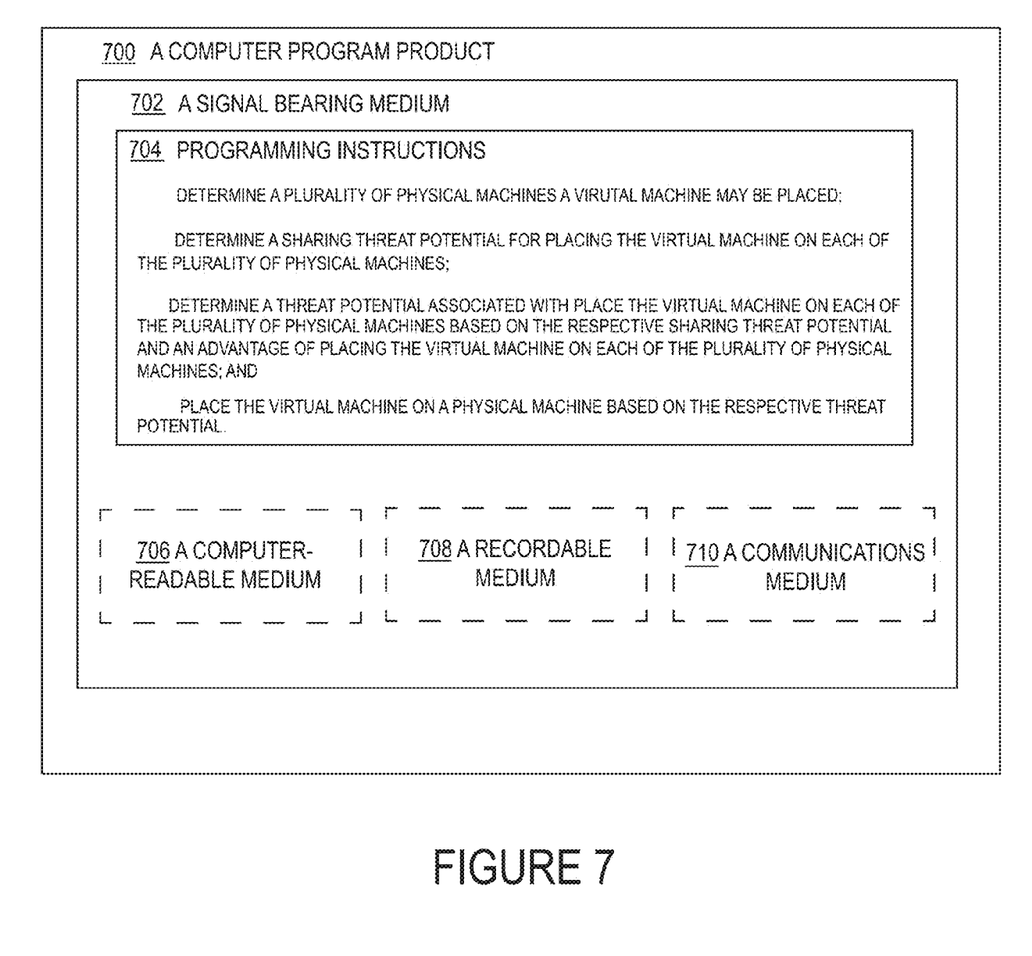
FIG. 7 is a block diagram illustrating an example computer program product that is arranged to store instructions for virtual machine placement security.

FIG. 7 is a block diagram illustrating an example computer program product 700 that is arranged to store instructions for virtual machine placement security, arranged in accordance with at least some embodiments of the present disclosure. The signal bearing medium 702 which may be implemented as or include a computer-readable medium 706, a computer recordable medium 708, a computer communications medium 710, or combinations thereof, stores programming instructions 704 that may configure the processing unit to perform all or some of the processes previously described. These instructions may include, for example, one or more executable instructions for causing a one or more processors to determine a plurality of physical machines a virtual machine may be placed, determine a sharing threat potential for placing the virtual machine on each of the plurality of physical machines, determine a threat potential associated with placing the virtual machine on each of the plurality of physical machines based on the respective sharing threat potential and an advantage of placing the virtual machine on each of the plurality of physical machines, and place the virtual machine on a physical machine based on the respective threat potential.

The present disclosure is not to be limited in terms of the particular examples described in this application, which are intended as illustrations of various aspects. Many modifications and examples can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various examples of the devices and/or processes via the use of block diagrams, flowcharts, and/or examples, such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method, comprising:
   determining, by a processor, a shared threat potential for a virtual machine on each physical machine of a plurality of physical machines based, at least in part, on a degree of co-location that the virtual machine has with a respective current virtual machine that operates on each physical machine of the plurality of physical machines;
   determining, by the processor, a workload threat potential for the virtual machine on each physical machine of the plurality of physical machines based, at least in part, on a level of advantage associated with placement of the virtual machine on each physical machine of the plurality of physical machines;
   determining, by the processor, a plurality of threat potentials for the virtual machine based, at least in part, on a combination of the shared threat potential and the workload threat potential;
   determining, by the processor, a smallest threat potential of the plurality of threat potentials for the virtual machine;
   placing, by the processor, the virtual machine on a particular physical machine of the plurality of physical machines, in response to the smallest threat potential of the plurality of threat potentials being below a first threshold, wherein the particular physical machine corresponds to the smallest threat potential; and
   monitoring, by a side channel monitor, the particular physical machine for side channel attacks, in response to the smallest threat potential of the plurality of threat potentials being greater than a second threshold, wherein the side channel monitor is activated by the processor.

2. The method of claim 1, wherein determining the shared threat potential comprises determining an amount of resource sharing that the virtual machine will have with the respective current virtual machine, on each physical machine of the plurality of physical machines, and wherein a higher amount of resource sharing is indicative of a higher shared threat potential.

3. The method of claim 1, wherein a higher degree of co-location increases the shared threat potential, and wherein degrees of co-location on each physical machine include board level, chip level, and core level.

4. The method of claim 1, wherein determining the shared threat potential comprises determining a number of current virtual machines that the virtual machine will be co-located with on each physical machine.

5. The method of claim 4, wherein the shared threat potential is at a maximum when the virtual machine is co-located with a single current virtual machine.

6. The method of claim 1, wherein determining the workload threat potential comprises:
determining a profile for the virtual machine; and
comparing the profile to a profile of the respective current virtual machine that operates on each physical machine of the plurality of physical machines.

7. The method of claim 6, wherein:
comparing the profile to the profile of the respective current virtual machine that operates on each physical machine of the plurality of physical machines comprises determining how complementary the profile of the virtual machine is with the profile of the respective current virtual machine that operates on each physical machine of the plurality of physical machines,
an increase in how complementary the profile of the virtual machine is with the profile of the respective current virtual machine increases the level of advantage, and
an increase in the level of advantage is indicative of an increased workload threat potential.

8. The method of claim 6, wherein the profile of the virtual machine describes a plurality of resource requirements for the virtual machine, and wherein the plurality of resource requirements include processor usage, network usage, memory usage, or combinations thereof.

9. A non-transitory computer-readable medium that includes computer executable instructions stored thereon to perform, in response to execution of the computer executable instructions by a processor, a virtual machine placement procedure, the virtual machine placement procedure comprising:
identify a plurality of physical machines;
determine a respective shared threat potential associated with placement of the virtual machine on each physical machine of the plurality of physical machines;
determine a plurality of threat potentials associated with the placement of the virtual machine on each physical machine of the plurality of physical machines, wherein the determination of the plurality of threat potentials is based on the respective shared threat potential and a respective advantage of the placement of the virtual machine on each physical machine of the plurality of physical machines;
determine a smallest threat potential of the plurality of threat potentials;

place the virtual machine on a particular physical machine of the plurality of physical machines, in response to the smallest threat potential of the plurality of threat potentials being below a first threshold, wherein the particular physical machine corresponds to the smallest threat potential; and
monitor the particular physical machine for side channel attacks, in response to the smallest threat potential of the plurality of threat potentials being greater than a second threshold.

10. The non-transitory computer-readable medium of claim 9, wherein the determination of the respective shared threat potential is based, at least in part, on a level of sharing that the virtual machine will have with a respective current virtual machine on each physical machine of the plurality of physical machines.

11. The non-transitory computer-readable medium of claim 10, wherein the level of sharing that the virtual machine will have with the respective current virtual machine on each physical machine of the plurality of physical machines, is indicative of a degree of co-location that the virtual machine will have with the respective current virtual machine.

12. The non-transitory computer-readable medium of claim 11, wherein the respective shared threat potential increases for increased degrees of co-location.

13. The non-transitory computer-readable medium of claim 9, wherein a determination of the plurality of physical machines on which the virtual machine is to be placed is based, at least in part, on a profile of the virtual machine.

14. The non-transitory computer-readable medium of claim 9, wherein the respective advantage of the placement of the virtual machine on each physical machine of the plurality of physical machines is based, at least in part, on a profile of the virtual machine.

15. The non-transitory computer-readable medium of claim 14, wherein a more unique profile for the virtual machine corresponds to a higher respective advantage of the placement of the virtual machine on each physical machine of the plurality of physical machines.

16. The non-transitory computer-readable medium of claim 15, wherein the higher respective advantage corresponds to a more elevated risk for the placement of the virtual machine on each physical machine of the plurality of physical machines.

17. A method, comprising:
receiving, at a virtual machine placement system, an identification of a virtual machine to place into a data center that includes a plurality of physical machines coupled to a virtual machine placement interface;
determining, by the virtual machine placement system, a plurality of available physical machines on which the virtual machine is to be placed, wherein the determination is based, at least in part, on a profile of the virtual machine;
estimating, by the virtual machine placement system, a plurality of respective risk levels associated with placement of the virtual machine on each physical machine of the plurality of available physical machines;
determining, by the virtual machine placement system, a smallest respective risk level of the plurality of respective risk levels;
placing, by the virtual machine placement system, the virtual machine on a particular available physical machine of the plurality of available physical machines based on the smallest respective risk level of the plurality of respective risk levels, wherein the smallest respective risk level corresponds to the particular physical machine, and wherein the smallest respective risk level includes a normalized value based, at least in part, on the profile of the virtual machine; and monitoring, by a side channel monitor, the particular available physical machine for side channel attacks, based on the smallest respective risk level being greater than a second threshold, wherein the side channel monitor is activated by the virtual machine placement system.

18. The method of claim 17, further comprising:

comparing, by the virtual machine placement system, the smallest respective risk level to a first threshold; and based on the smallest respective risk level being greater than the first threshold, activating, by the virtual machine placement system, a new physical machine of the plurality of available physical machines.

19. The method of claim 17, further comprising:

comparing, by the virtual machine placement system, the smallest respective risk level to the second threshold, wherein placing the virtual machine on the particular physical machine includes placing, by the virtual machine placement system, the virtual machine on the particular physical machine based on the smallest respective risk level being greater than the second threshold.

20. The method of claim 18, further comprising:

placing, by the virtual machine placement system, the virtual machine on the new physical machine of the plurality of available physical machines.

21. A virtual machine placement system, comprising:

at least one processor; and at least one computer readable medium coupled to the at least one processor and encoded with instructions, wherein the instructions are executable by the at least one processor to perform or control performance of operations that include:

determine a plurality of available physical machines on which a virtual machine is to be placed;

determine a respective shared threat potential associated with placement of the virtual machine on each physical machine of the plurality of available physical machines;

determine a plurality of threat potentials associated with the placement of the virtual machine on each physical machine of the plurality of available physical machines, wherein the determination of the plurality of threat potentials is based, at least in part, on the respective shared threat potential and a respective advantage of the placement of the virtual machine on each physical machine of the plurality of available physical machines;

determine a smallest threat potential of the plurality of threat potentials associated with the placement of the virtual machine on each physical machine of the plurality of available physical machines;

place the virtual machine on a particular available physical machine of the plurality of available physical machines, in response to the smallest threat potential of the plurality of threat potentials, wherein the particular available physical machine corresponds to the smallest threat potential, and wherein the smallest threat potential includes a normalized value based, at least in part, on a profile of the virtual machine; and monitor, the particular available physical machine for side channel attacks, based on the smallest threat potential.

22. The virtual machine placement system of claim 21, wherein the operations further include:

compare the smallest threat potential to a first threshold;

based on the smallest threat potential being greater than the first threshold, allocate an additional available physical machine of the plurality of available physical machines; and place the virtual machine on the additional available physical machine.

23. The virtual machine placement system of claim 22, wherein the operations further include:

compare the smallest threat potential with the second threshold, wherein the placement of the virtual machine on the particular available physical machine is based on the smallest threat potential being greater than the second threshold.

24. The virtual machine placement system of claim 21, wherein the operations further include:

activate a side channel monitor, wherein the side channel monitor is configured to monitor the particular available physical machine and to monitor the plurality of available physical machines, for the side channel attacks, based on the smallest threat potential being greater than the second threshold.

\* \* \* \* \*